United States Patent [19]

Thioux

[11] Patent Number: 4,993,519
[45] Date of Patent: Feb. 19, 1991

[54] BRAKE WITH TWO DISCS OF FIXED SPACING

[75] Inventor: Alain Thioux, Bry sur Marne, France

[73] Assignee: Bendix France, Drancy, France

[21] Appl. No.: 422,855

[22] Filed: Oct. 17, 1989

[30] Foreign Application Priority Data

Oct. 28, 1988 [FR] France .................. 88 14120

[51] Int. Cl.$^5$ ............................. F16D 55/10
[52] U.S. Cl. .................. 188/71.3; 188/71.5; 188/73.34; 188/73.39; 188/73.45
[58] Field of Search ............ 188/71.3, 71.5, 73.31, 188/73.34, 73.45, 73.39; 192/70

[56] References Cited

U.S. PATENT DOCUMENTS

| | | | |
|---|---|---|---|
| 3,951,239 | 4/1976 | Newstead | 188/71.5 |
| 4,040,506 | 8/1977 | Newstead | 188/72.5 |
| 4,234,061 | 11/1980 | Margetts et al. | 188/71.3 |
| 4,505,363 | 3/1985 | Herbulot et al. | 188/72.5 |
| 4,630,713 | 12/1986 | Carre et al. | 188/73.39 X |
| 4,673,065 | 6/1987 | Gerard et al. | 188/73.38 |

FOREIGN PATENT DOCUMENTS

| | | | |
|---|---|---|---|
| 2141857 | 3/1972 | Fed. Rep. of Germany | |
| 2232702 | 1/1975 | France | |
| 2515758 | 5/1983 | France | |
| 120370 | 9/1979 | Japan | 188/73.34 |
| 2009345 | 6/1979 | United Kingdom | |
| 2039646 | 8/1980 | United Kingdom | 188/73.34 |

Primary Examiner—George E. A. Halvosa
Attorney, Agent, or Firm—Larry J. Palguta; Ken C. Decker

[57] ABSTRACT

The present invention relates to a disc brake for a motor vehicle, comprising an inner (12) and an outer (14) disc, fastened one to the other and with a fixed spacing (D), an outer pair and an inner pair of friction elements for coming into frictional engagement with the opposite faces of the two discs, and support (16) and control (42, 42') members intended for laying the friction elements against their respective disc, the brake comprising a supporting yoke (16) extending both on the inside of the inner disc (12), in the gap (D) between the two discs, and on the outside of the outer disc (14), an inner caliper, interacting with the inner pair (40i, 40e) of friction elements, and an outer caliper, interacting with the outer pair (40'i, 40'e) of friction elements, the two calipers (42, 42') being mounted slidably in the supporting yoke (16). The inner caliper (42) comprises a body (44) in the form of an upturned U, the base (46) of which straddles the inner disc (12) and has an outer wing (48) descending into the gap (D) between the two disc (12, 14) and coming into contact with fraction element (40e) and an inner wing descending on the inner side of the inner disc (12), forming a cylinder (52), receiving a piston (54) in contact with friction element (40i). The outer caliper (42') comprises a body (44') in the form of an upturned U, the base (46') of which straddles the two discs (12, 14) and has an outer wing (48') descending on the outside of the outer disc (14) and comes into contact with friction elements (40'e) and an inner wing (50') descending on the inside of the inner disc (12), forming a cylinder (52') receiving a piston (54'), and the caliper (42') having a spacer (74) in the form of an upturned U, the base (26) of which straddles the inner disc (12) in a radial gap (I) separating the periphery of the inner disc (12) and the base (46') of the caliper and having an inner wing descending on the inner side of the inner disc (12) in order to come into contact with the piston (54'), and a outer wing descending in the gap (D) between the two discs in order to come into contact with friction element (40'i).

10 Claims, 5 Drawing Sheets

BRAKE WITH TWO DISCS OF FIXED SPACING

BACKGROUND OF THE INVENTION

The present invention relates to a brake with two discs of fixed spacing.

Single-disc brakes have an inherent limitation in that the disc has only two friction surfaces.

It is known to overcome this limitation by multiplying the number of discs. However, in most cases, this type of multiple-disc brakes comprises a stack of alternate discs and friction rings integral in terms of rotation, but free in terms of translational motion relative to a rotating axle and relative to a stationary cylinder respectively.

In current practice, these complex and costly brakes are reserved for aeronautics.

Where mass-production motor vehicles are concerned, however, the aim is to manufacture brakes which are both simple and economical and which can be serviced and maintained at the least possible cost.

The basis for a solution involves producing a brake with two discs of fixed spacing, thus avoiding the problems inherent in the abovementioned brakes with sliding discs. In fact, the fixed mounting of two discs parallel to one another presents very few difficulties.

In contrast, the main problem is in the arrangement and control of the two pairs of friction elements and of the supporting members associated with them.

U.S. Pat. No. 4,505,363 provided a brake with two discs of fixed spacing comprising a stationary support common to two calipers and extending over an angular sector of approximately 180°. The two calipers are composed of pieces in the form of risers engaged axially slidably in means for guiding the common stationary support circumferentially one after the other, head to foot, the hydraulic motors associated with the two calipers being located on either side of the pair of discs.

There are many disadvantages of such a brake: it has a large axial bulk. Moreover, to function, it requires a considerable space in order to allow for the removal of the calipers when the linings have reached their maximum acceptable wear. Finally, the yoke and the calipers cover the discs over more than half their surface, this being detrimental to their ventilation and their cooling.

The maintenance of such a brake also presents disadvantages: mounting all the movable elements of the brake slidably on transverse slideways raises other problems well known to an average person skilled in the art: corrosion of the sliding surfaces, jamming by wedging when skewing occurs, difficulty in removing the brake, if only to replace the pads carrying the friction linings.

SUMMARY OF THE INVENTION

An object of the present invention is to remedy these disadvantages by means of a disc brake for a motor vehicle, comprising a pair of rotary discs, respectively an inner and an outer, fastened one to the other and with a fixed spacing, two pairs of friction elements, an outer pair and an inner pair respectively intended for coming into frictional engagement with the opposite faces of the two discs, the outer and the inner respectively, and support and control members intended for laying the friction elements of the two pairs against their respective discs and for absorbing the resulting braking torque, the brake comprising a supporting yoke extending both on the inside of the inner disc, in the gap between the two discs, and on the outside of the outer disc, a first clamping caliper, called an inner caliper, interacting with the inner pair of friction elements, and a second clamping caliper, called an outer caliper, interacting with the outer pair of friction elements, the two calipers being mounted slidably in the supporting yoke, the inner caliper comprising a body in the form of an upturned U, the base of which straddles the inner disc and has an outer wing descending into the gap between the two discs and coming into contact with the external friction element of the pair of internal friction elements, and an inner wing descending on the inner side of the inner disc, forming a cylinder, receiving a piston in contact with the internal friction element of the pair of internal friction elements.

According to the invention, the outer caliper comprises a body in the form of an upturned U, the base of which straddles the two discs and has an outer wing descending on the outside of the outer disc and comes into contact with the external friction element of the pair of external friction elements, and an inner wing descending on the inside of the inner disc, forming a cylinder receiving a piston, and the caliper having a spacer in the form of an upturned U, the base of which straddles the inner disc in a radial gap separating the periphery of the inner disc and the base of the caliper, and having an inner wing descending on the inner side of the inner disc in order to come into contact with the piston, and an outer wing descending in the gap between the two discs in order to come into contact with the internal friction element of the pair of external friction elements.

BRIEF DESCRIPTION OF THE DRAWINGS

The invention will now be described by way of example with reference to the accompanying drawings in which.

DETAILED DESCRIPTION OF THE INVENTION

Figure 1:
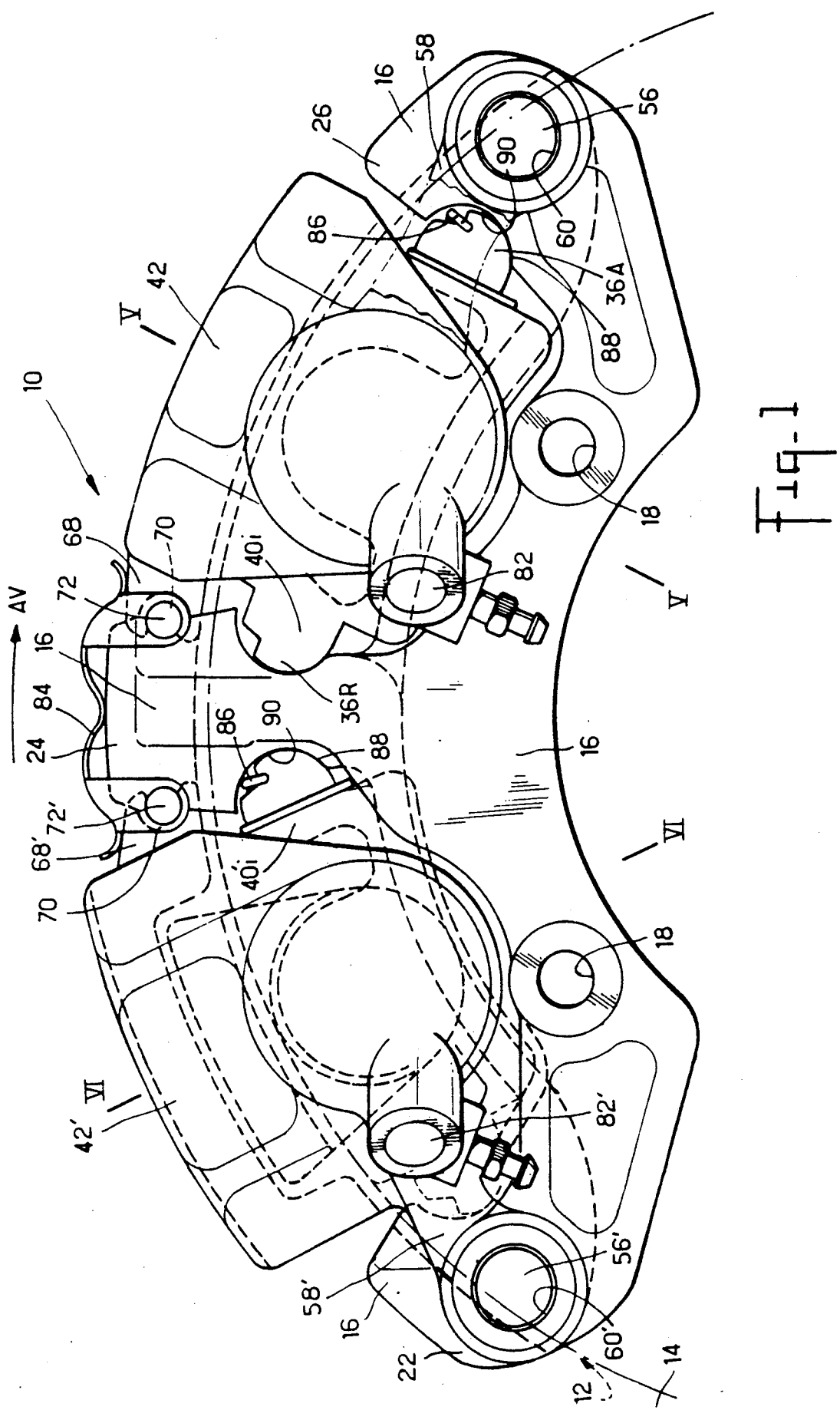
FIG. 1 is a side view of a disc brake according to one embodiment of the invention.
Figure 2:
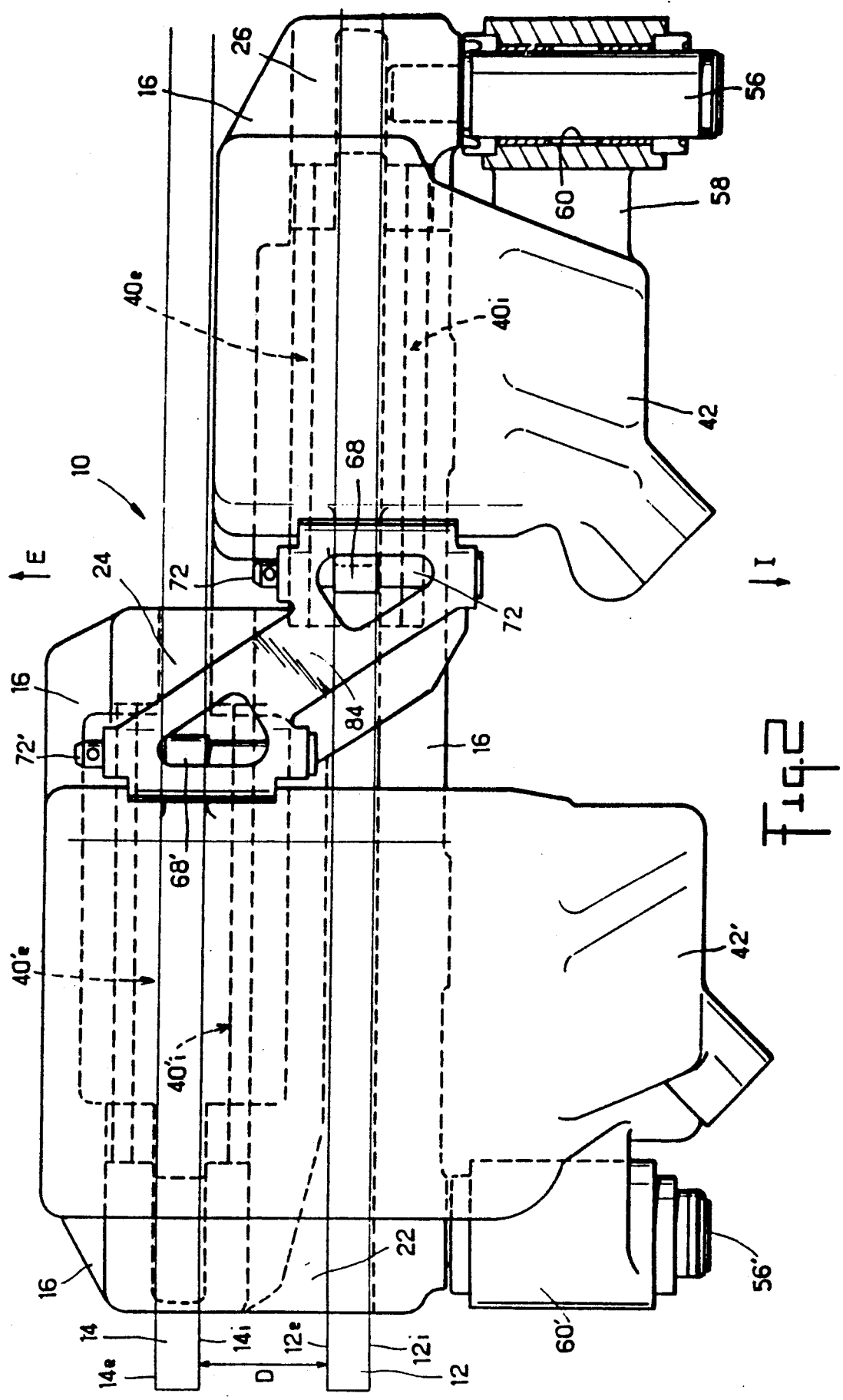
FIG. 2 is a top view of the brake of FIG. 1.

The disc brake 10, illustrated in a side view in FIG. 1 and in a top view in FIG. 2, comprises two discs fastened to a rotating element of the vehicle, for example an axle shaft, and it is possible to distinguish, by their position in relation to the longitudinal axis of the vehicle, an outer disc 14 located near the wheel rim (not shown) and an inner disc 12 opposite the outer disc and separated from the latter by fixed distance D.

The inside and the outside of the brake are designated in the Figures by the arrows I and E respectively.

A yoke 16 or torque-absorbing element is fastened to a non-rotary part of the vehicle, such as, for example, the axle journal (also not shown), by means of screws engaged in internally threaded holes 18 in the yoke.

Figure 3:
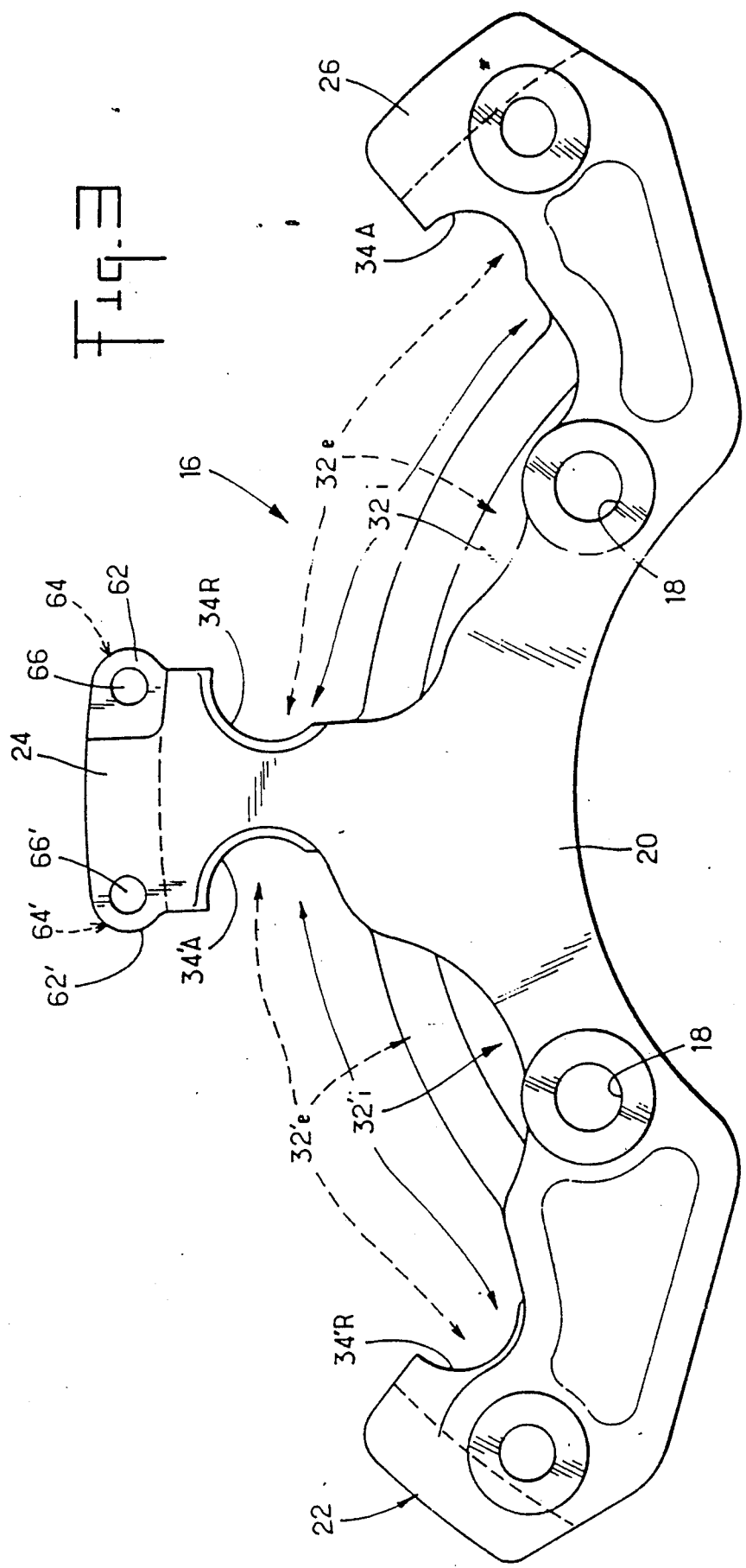
FIG. 3 is a side view of the brake yoke.
Figure 4:
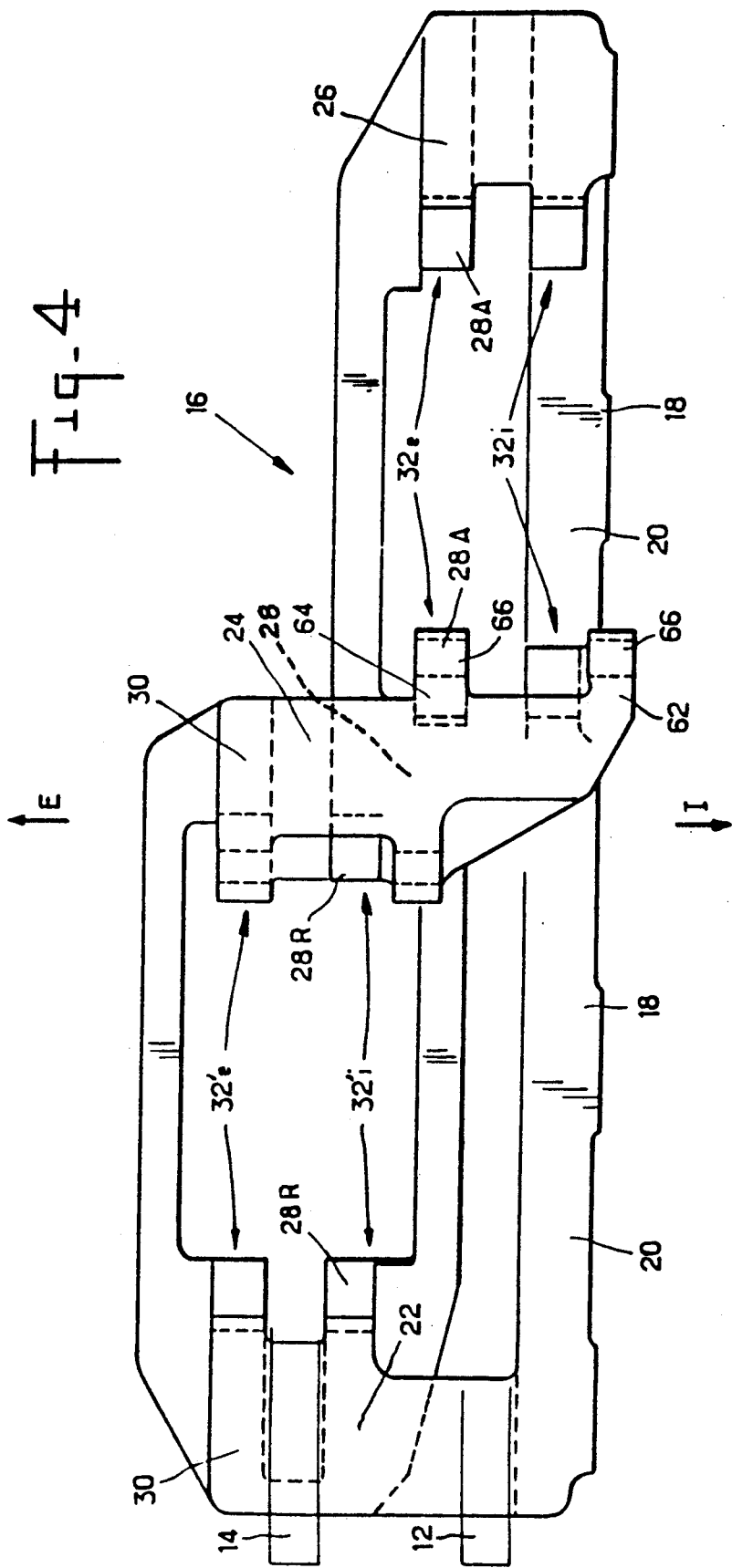
FIG. 4 is a top view of the yoke of FIG. 3.

This yoke 16 is formed in one piece and breaks down into several parts:

an inner part 20 (FIG. 3) of substantially plane form and extending substantially parallel to the discs on the inside of the inner disc, three bridge-forming parts 22, 24, 26 (FIG. 4) straddling the periphery of the discs, the first bridge 22, called the left and located on the left in the Figure, straddles the two discs and extends beyond the outer disc; the second bridge 24, called central and located in the center, likewise extends beyond the outer disc 14, while the third bridge 26, called the right and located on the right in the Figure, straddles the inner disc 12 and stops before the outer disc 14, a substantially planar intermediate part 28 (FIG. 4) attached to the three bridges 22, 24, 26 and penetrating into the gap D separating the two discs 12, 14, a substantially planar outer part 30 attached to the first two bridges 22, 24 and extending substantially parallel to the outer disc on the outside of the latter.

The parts of the yoke 16 have a certain number of orifices intended for accommodating friction elements.

More specifically, the inner yoke part 20 has, between the central bridge 24 and the right bridge 26, an orifice 32i bordered on the right and left in the direction of rotation by two semi-circular indentations 34A, 34R, intended for receiving semi-circular lugs 36A, 36R likewise formed on the two edges of the friction elements.

Figure 5:
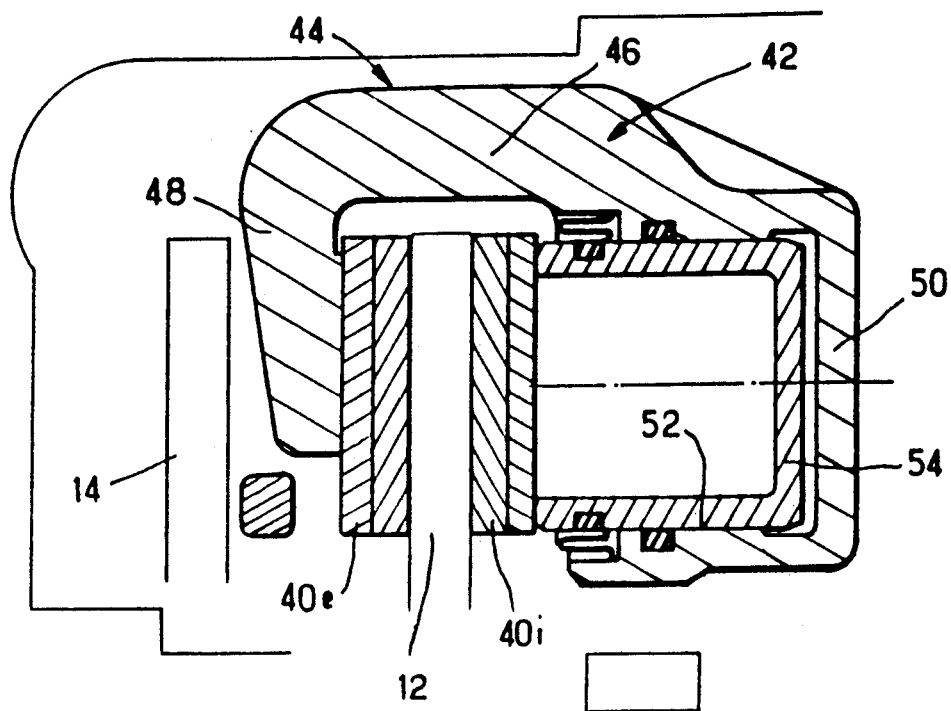
FIG. 5 is a sectional view along the line V—V of FIG. 1.

The friction elements 40e and 40i (FIGS. 2 and 5) are well known in the art and will not be described in detail. They are composed of a metal support plate, to which is fastened a block of friction material or lining intended to come into frictional engagement with one of the faces of the disc.

Thus, the orifice 32i of the inner yoke part 20 receives a friction elements 40i opposite the inner face 12i of the inner disc 12.

The intermediate yoke part 28 is composed of two successive planar elements 28R, 28A connected to one another and offset, the first element 28R between the first and second bridges 22, 24 being brought close to the inner face 14i of the outer disc 14, and the second element 28A between the second and third bridges 24, 26 being brought close to the outer face 12e of the inner disc 12.

The second element 28A of the intermediate yoke part has an orifice 32e similar to that of the inner yoke part and intended for receiving a friction element 40e opposite the outer face 12e of the inner disc 12, the two friction elements 40i and 40e confronting one another on either side of the inner disc 12.

The intermediate yoke part, in its first plane element 28R, has an orifice 32'i similar to the orifices already described and intended for receiving a friction element 40'i opposite the inner face 14i of the outer disc 14, and the outer yoke part 30 has a like orifice 32'e intended for receiving a friction element 40'e opposite the outer face 14e of the outer disc 14.

Two clamping calipers are provided for laying the friction elements under pressure against their respective discs.

The first caliper, located on the right in the Figure, called an inner caliper 42 because it interacts with the friction elements 40i and 40e on either side of the inner disc 12, comprises a body 44 (FIG. 5) in the form of an upturned U, of which the base 46 straddles the inner disc 12 and the wings 48, 50 descend parallel to the disc. One of the wings 48, called the outer, extends in the gap D between the discs and is laid against the support plate of the outer friction element 40e, while the inner wing 50 forms a cylindrical chamber 52 for a control piston 54, the latter being laid directly or indirectly against the support plate of the inner friction element 40i. Thus, when the cylinder 52 is put under pressure, the piston 54 lays a friction element 40i against the inner face 12i of the disc, while, as a result of reaction via the caliper 42, the outer wing 48 of the latter lays the other friction element 40e against the outer face 12e of the disc.

The tangential forces generated between the disc 12 and the friction elements 40i, 40e are absorbed essentially by the yoke 16, because the supports of the friction elements come up against the indentations 34A, 34R provided for this purpose in the yoke orifices 32i, 32e.

The caliper 42 is mounted slidably and, as the occasion arises, tiltably relative to the yoke 16 in the following way: the yoke carries, on one side of the caliper 42, a guide column 56 perpendicular to the planes of the discs, and the caliper body 46 carries a lateral protuberance 58 forming a bush 60 slipped onto the guide column 56. Thus, the caliper 42 can move relative to the yoke 16 in proportion to the wear of the friction linings, as is well known.

On the other side of the caliper 42, the yoke 16 possesses a pair of lugs 62, 64, through which passes a bore 66 perpendicular to the plane of the discs, and the caliper has a lateral projection 68 equipped with a corresponding bore 70 or at least with a notch aligned with the bores of the yoke lugs. A locking rod 72 is engaged into the bores 66 of the yoke lugs 62, 64 and the bore 70 or notch of the caliper 42.

The caliper 42 is thus held securely with the possibility of sliding relative to the yoke 16. It can also be tilted about the column 56, in order to free the friction elements 40i, 40e for their inspection or replacement. For this, it is sufficient to extract the locking rod 72 opposite the column 56.

On the other side, on the left in the Figure, the brake possesses a second caliper, called an outer caliper 42', intended for laying the friction elements 40'e and 40'i against the outer disc.

Figure 6:
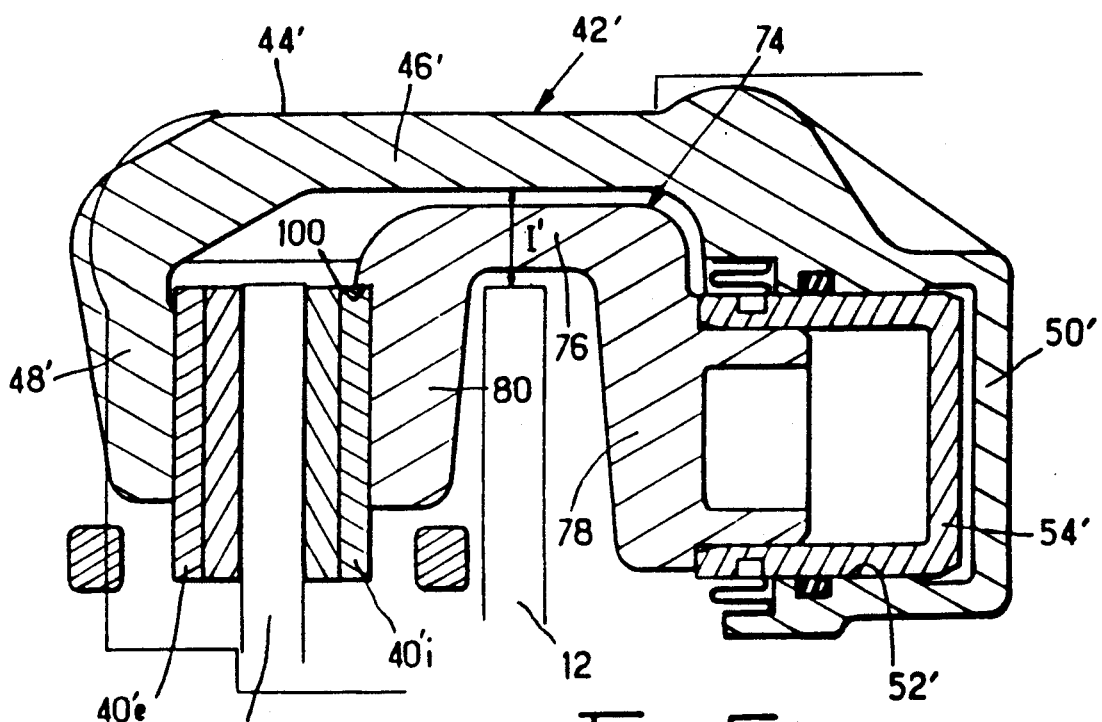
FIG. 6 is a sectional view along the line VI—VI of FIG. 1.

According to the invention, the structure of the outer caliper 42' is in the form of an upturned U, of which the base 46' (FIG. 6) straddles the two discs. The outer wing 48' descends beyond the outer disc 14 and bears against a friction element 40'e, while the inner wing 50' descends on the inside of the inner disc 12, likewise forming a cylinder 52' receiving a drive piston 54.

Apart from the difference in length this second caliper 42' has another difference from the first. In fact, in order to transmit the forces of the piston 54' to the friction element 40'i opposite the inner face of the outer disc 14, this caliper 42' has a spacer 74, likewise in the form of an upturned U, of which the base 76 straddles the inner disc 12 in a radial gap I' free between the periphery of this disc and the base 46' of the caliper, an inner wing 78 descends on the inside of the inner disc 12 in order to come in contact with a piston 54', and an outer wing 80 descends in the gap D between the two discs, in order to come in contact with the friction element 40'i opposite the inner face of the outer disc 14.

To prevent the rotation of the piston 54' and therefore of the spacer 74, which could cause the latter to rub against the disc 12, a receptacle 100 whose shape fits that of the friction element 40'i is made in the outer wing 80 of this spacer, in order to index it relative to the friction element 40'i.

This caliper 42' is likewise mounted slidably and tiltably relative to the yoke by means of an assembly with a column 56' and bush 60' and by means of a locking rod 72' passing through bores 66' in lugs 62', 64' of the yoke 16 and a bore 70 or a lateral notch in the caliper.

The disc brake functions as follows:

When the brake is applied, brake fluid under pressure is admitted simultaneously via feed ports 82, 82' into the two cylinders 52, 52' of the inner and outer calipers 42, 42'.

In the inner caliper 42, the piston 54 pushes the friction element 40i into frictional engagement against the inner face 12i of the inner disc 12, and, as a result of reaction via the caliper 42, the outer wing 48 of the latter pushes the friction element 40e into frictional engagement against the outer face 12e of the disc 12.

In the outer caliper 42', the piston 54' pushes the inner wing 78 of the spacer 74, and the latter, by means of its outer wing 80, pushes the friction element 40'i into engagement against the inner face 14i of the outer disc 14, and, as a result of reaction via the caliper 42', the outer wing 48' of the latter pushes the friction element 40'e into frictional engagement against the outer face 14e of the disc.

Two other particular features of the brake just described will be noted:

A double spring 84 held by the locking rods 72, 72' bears on the central bridge 24 of the yoke 16 and stresses towards the axis of the discs those ends 68, 68' of the calipers 42, 42' opposite the columns 56, 56'.

The purpose of this spring is to prevent vibrations of the calipers 42, 42' caused by the vibrations of the vehicle.

Moreover, the friction elements 40 possess springs 86 in the region of their lateral semi-circular protuberances 36A. These springs push these protuberances 36A towards the axis of the discs and rearwards, in order, at rest, to define a point of lower lateral contact 88 between the protuberances 36A of the friction elements and the semi-circular indentations 34A, 34'A of the yoke which receive them.

These springs 86 are placed at the ends 36A of the friction elements located at the torque output for forward braking (the arrow A in FIG. 1). Thus, for each forward braking, the friction elements 40 move progressively along the inner surface of the indentations 34A, 34'A from the point of lateral contact 88 to a point of front contact 90, and when the brake is released the friction elements are returned by the springs 86 into their rest position in lateral contact 88. This results in a continuous sweeping of the contact surface between the friction elements 40 and the yoke 16, thus preventing jamming or seizing.

By reaction, the opposite protuberances 36R are likewise kept in permanent virtually frontal contact with the opposite indentations 34R, 34'R of the yoke. This makes it possible to prevent rattling between the friction elements 40 and the yoke 16 during reverse braking.

In order to simplify the manufacture of the friction elements 40 and their assembly, they are all identical and symmetrical relative to a radial plane, the same being true of the orifices 32 receiving them.

It will be appreciated that the springs 86 can be replaced by any other spring defining the exertion of a radial force and a tangential force on the friction elements, for example according to U.S. Pat. No. 4,673,065.

Furthermore, the columns can be placed in a different position from that illustrated in the Figures. In particular, the two columns can be placed at the torque input in relation to the calipers.

There has thus been provided, according to the invention, a brake with two discs of fixed spacing, in which:

the two cylinders of the calipers forming hydraulic motors are located on the same side of the pair of discs, thus obtaining a brake of reduced axial bulk, the brake according to the invention can be installed in a reduced volume, since, in the course of the wear of the friction elements, the retreats of the two calipers take place in the same direction towards the inside of the brake and to some extent compensate one another, whereas they are added together in the prior art where the motors are on either side of the pair of discs, the two cylinders of the calipers can be fed by means of a dual brake circuit, thereby providing increased safety, the angular offset of the two calipers and therefore of the friction elements is less than in the prior art, the effect of which is to allow the dissipation of heat over a more extensive zone than in a brake in which the friction elements are set apart, for example that of U.S. Pat. No. 4,505,363.

What we claim is:

1. A disc brake for a motor vehicle, comprising a pair of rotary discs, respectively an inner and an outer, fastened one to the other and with a fixed spacing, two pairs of friction elements, an outer pair and an inner pair respectively intended for coming into frictional engagement with opposite faces of the two discs, outer and the inner respectively, and support and control members intended for laying the friction elements of the two pairs against their respective discs and for absorbing the resulting braking torque, the brake comprising a supporting yoke extending both inside of the inner disc, in a gap between the two discs, and outside of the outer disc, a first clamping caliper, called an inner caliper, interacting with the inner pair of friction elements, and a second clamping caliper, called an outer caliper, interacting with the outer pair of friction elements, the two calipers being mounted slidably in the supporting yoke, the inner caliper comprising a body in the form of an upturned U, a base of which straddles the inner disc and has an outer wing descending into the gap between the two discs and coming into contact with an external friction element of the pair of inner friction elements, and an inner wing descending on the inner side of the inner disc, forming a cylinder, receiving a piston in contact with an internal friction element of the pair of inner friction elements, and the outer caliper comprising a body in the form of an upturned U, a base of which straddles the two discs and has an outer wing descending outside of the outer disc and coming into contact with an outer friction element of the pair of external friction elements, and an inner wing descending inside of the inner disc, forming a cylinder receiving a piston, and the caliper having a spacer in the form of an upturned U, a base of which straddles the inner disc in a radial gap separating the periphery of the inner disc and the base of the caliper and having an inner wing descending on the inner side of the inner disc in order to come into contact with the piston, and an outer wing descending in the gap between the two discs in order to come into contact with the internal friction element of the pair of outer friction elements.

2. The disc brake according to claim 1, wherein a receptacle of a form complementary to that of a friction element of the pair of outer friction elements is made on the outer wing of the spacer.

3. The disc brake according to claim 1, wherein the two calipers are mounted slidably relative to the yoke by means of an assembly with columns carried by the yoke and with bushes carried by the two calipers respectively.

4. The disc brake according to claim 3, wherein the yoke has two pairs of lugs, through each of which passes a bore perpendicular relative to the plane of the discs, and wherein the calipers each have a lateral projection equipped with one of a bore and a notch aligned with the bores of the lugs.

5. The disc brake according to claim 4, wherein a locking rod is engaged in the bores of the lugs of the yoke and in one of the bores and notches of the calipers.

6. The disc brake according to claim 5, wherein a spring is held by the locking rods, bears on the central bridge of the yoke and stresses the ends of the calipers opposite the columns towards the axis of the discs.

7. The disc brake according to claim 6, wherein the yoke has orifices for receiving the friction elements, respectively two orifices for receiving the friction elements of the inner disc and formed opposite one another in an inner part and in an intermediate part of the yoke between second and third bridges, and two orifices for receiving the friction elements of the outer disc and formed opposite one another in an intermediate part and in an outer part of the yoke between first and second bridges.

8. The disc brake according to claim 1, wherein the yoke is in one piece and comprises:
   a substantially planar inner part extending on the inside of the inner disc,
   three bridges extending from the inner part and straddling the discs, in succession a first bridge, called the left, straddling the two discs, a second bridge, called the central, likewise straddling the two discs, and a third bridge, called the right, straddling the inner disc,
   a substantially planar intermediate part extending from the three bridges and descending in the gap separating the two discs,
   a substantially planar outer part extending from the first two bridges and descending on the outside of the outer disc.

9. The disc brake according to claim 8, wherein a spring is held by locking rods, bears on the central bridge of the yoke and stresses the ends of the calipers opposite columns and towards an axis of the discs.

10. The disc brake according to claim 9, wherein the yoke has orifices for receiving the friction elements, respectively two orifices for receiving the friction elements of the inner disc and formed opposite one another in the inner part and in the intermediate part of the yoke between the second and third bridges, and two orifices for receiving the friction elements of the outer disc and formed opposite one another in the intermediate part and in the outer part of the yoke between the first and second bridges.

* * * * *